United States Patent [19]
Webb

[11] Patent Number: 5,327,709
[45] Date of Patent: Jul. 12, 1994

[54] ADJUSTABLE HEADER FLOTATION MECHANISM

[75] Inventor: Bryant F. Webb, Ephrata, Pa.

[73] Assignee: Ford New Holland, Inc., New Holland, Pa.

[21] Appl. No.: 30,948

[22] Filed: Mar. 12, 1993

[51] Int. Cl.5 .......................................... A01D 47/00
[52] U.S. Cl. ...................................... 56/15.8; 56/14.4
[58] Field of Search ............... 56/15.8, 15.7, 14.9, 56/DIG. 1, DIG. 9, 208, 192, 10.2, DIG. 10, 14.4

[56] References Cited

U.S. PATENT DOCUMENTS

| | | | |
|---|---|---|---|
| 2,375,848 | 5/1945 | Hume | 56/15.7 |
| 3,783,594 | 1/1974 | Watt | 56/15.8 |
| 3,808,781 | 5/1974 | Bass | 56/15.8 |
| 3,959,957 | 6/1976 | Halls | 56/15.8 |
| 4,175,366 | 11/1979 | Cicci | 56/15.8 |
| 4,177,625 | 12/1979 | Knight et al. | 56/15.8 X |
| 4,177,627 | 12/1979 | Cicci | 56/15.8 |
| 4,206,582 | 6/1980 | Molzahn | 56/15.8 |
| 4,313,294 | 2/1982 | Martenas | 56/15.8 |
| 4,676,053 | 6/1987 | Pruitt | 56/15.2 X |
| 4,724,661 | 2/1988 | Blakeslee | 56/15.8 |
| 4,972,664 | 11/1990 | Frey | 56/15.8 |
| 5,060,462 | 10/1991 | Helfer | 56/15.8 |

Primary Examiner—Stephen J. Novosad
Attorney, Agent, or Firm—Larry W. Miller; Frank A. Seemar

[57] ABSTRACT

A flotation mechanism for use on a crop harvesting machine having a header suspended from the frame thereof by flotation springs is disclosed wherein a hydraulic cylinder interconnects the frame and at least one of the springs to allow selective adjustment of the weight of the header supported from the frame. The extensible hydraulic cylinder is operable to vary the length of at least one of the flotation springs while the crop harvesting machine is in operation and movable over the ground.

20 Claims, 4 Drawing Sheets

ADJUSTABLE HEADER FLOTATION MECHANISM

BACKGROUND OF THE INVENTION

This invention relates generally to self-propelled crop harvesting machines having a header suspended forwardly from the frame thereof to harvest crop material from the ground, and more particularly, to an adjustment mechanism associated with the header flotation springs to permit an on-the-go adjustment of the weight of the crop harvesting header resting on the ground.

Typically, self-propelled crop harvesting machines are provided with a wheeled frame supporting drive apparatus to power the movement of the machine over the ground and a crop harvesting header forwardly disposed to engage standing crop material to initiate the crop harvesting process. Such headers are movably connected to the frame and are provided with a flotation mechanism interposed between the frame and the header to support a portion of the weight of the header from the frame, the remainder of the header's weight usually resting on the ground.

Generally, such flotation mechanisms comprising a spring or a grouping of springs associated with laterally opposite sides of the header. By mounting the springs on a draw bolt apparatus, the operative length of the spring or spring assembly can be varied. As one skilled in the art will readily realize, the stretching of a spring results in the exertion of a force that is linearly proportional to the length of the spring. Such draw bolt mountings adjust the length of the spring and provide a setting for the amount of flotation force to be applied to the header. While the flotation setting can be varied while the machine is stationary, it would be preferable to provide a mechanism for adjusting or varying the flotation force while the crop harvesting machine is operatively moving over the ground.

Such a on-the-go adjustment of the flotation force will allow the operator of the crop harvesting machine to adjust the flotation force in response to the conditions he finds in the field as he is traversing across the ground. For example, should the operator encounter a soft spot in the field while he harvesting standing crop material, he could increase the flotation force to lighten the weight of the header resting on the ground and prevent the header from digging into the soft spot, which could cause damage to the header and possibly harm the crop being harvested. Accordingly, it is desirable to provide a mechanism for adjusting the flotation setting for a crop harvesting header while the header is in operation.

SUMMARY OF THE INVENTION

It is an object of this invention to provide a mechanism for adjusting the flotation force exerted on a crop harvesting header while the header is operatively moving over the ground.

It is another object of this invention to provide a remotely controlled linear actuator connected to the flotation springs for a crop harvesting header to permit a selective changing of the length of the springs while the header is in operation.

It is a feature of this invention that the flotation adjustment mechanism is operable to vary the weight of a crop harvesting header while the header is being operatively moved over the ground.

It is an advantage of this invention that the operator can change the flotation setting for a crop harvesting header from a remote location.

It is another feature of this invention that the maximum header flotation force can be set with the ram of the linear actuator positioned at its fully retracted position.

It is another advantage of this invention that the extension of the linear actuator ram will reduce the length of the flotation spring assembly and result in a lessening of the flotation force and, consequently, a corresponding increase in the amount of the header weight resting on the ground.

It is still another advantage of this invention that the flotation adjustment mechanism can be operatively associated with a single one of a group of springs comprising a flotation spring assembly.

It is yet another advantage of this invention that the flotation adjustment mechanism can be operatively associated with the entire flotation spring assembly to selectively vary the flotation force exerted on the crop harvesting header.

It is still another feature of this invention that the flotation adjustment mechanism can utilize a hydraulic cylinder that can be actuated from the operator's cab of the crop harvesting machine.

It is still another object of this invention to provide an crop harvesting header flotation adjustment mechanism for selectively varying the amount of flotation force exerted on the crop harvesting header which is durable in construction, inexpensive of manufacture, carefree of maintenance, facile in assemblage, and simple and effective in use.

These and other objects, features and advantages are accomplished according to the instant invention by providing a flotation mechanism for use on a crop harvesting machine having a header suspended from the frame thereof by flotation springs is disclosed wherein a hydraulic cylinder interconnects the frame and at least one of the springs to allow selective adjustment of the weight of the header supported from the frame. The extensible hydraulic cylinder is operable to vary the length of at least one of the flotation springs while the crop harvesting machine is in operation and movable over the ground.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
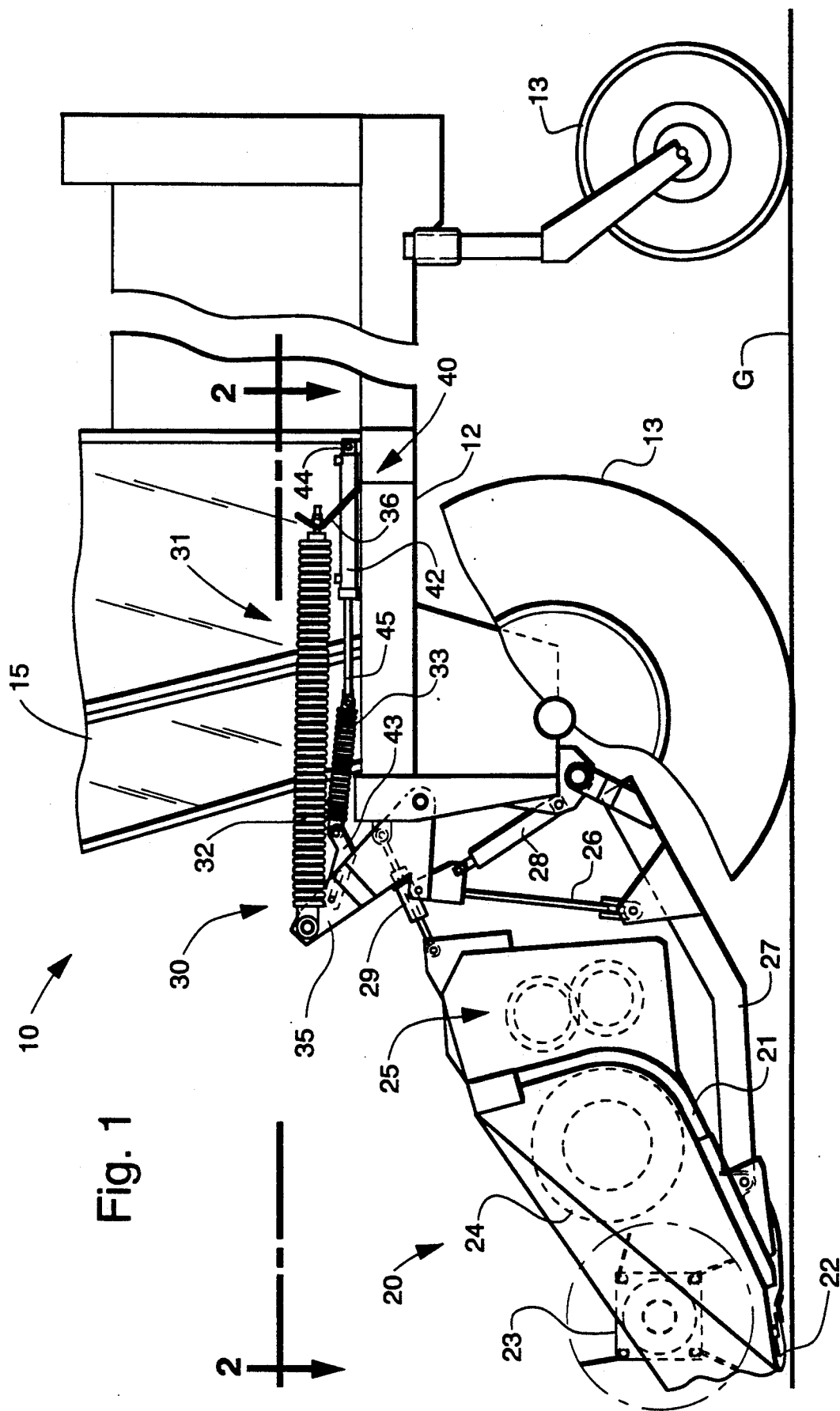
FIG. 1 is a fragmentary side elevational view of a crop harvesting machine incorporating the principles of the instant invention, the front wheel of the crop harvesting machine being partially broken away to best show the details of the crop harvesting header suspended from the frame of the crop harvesting machine in a crop engaging position.
Figure 2:
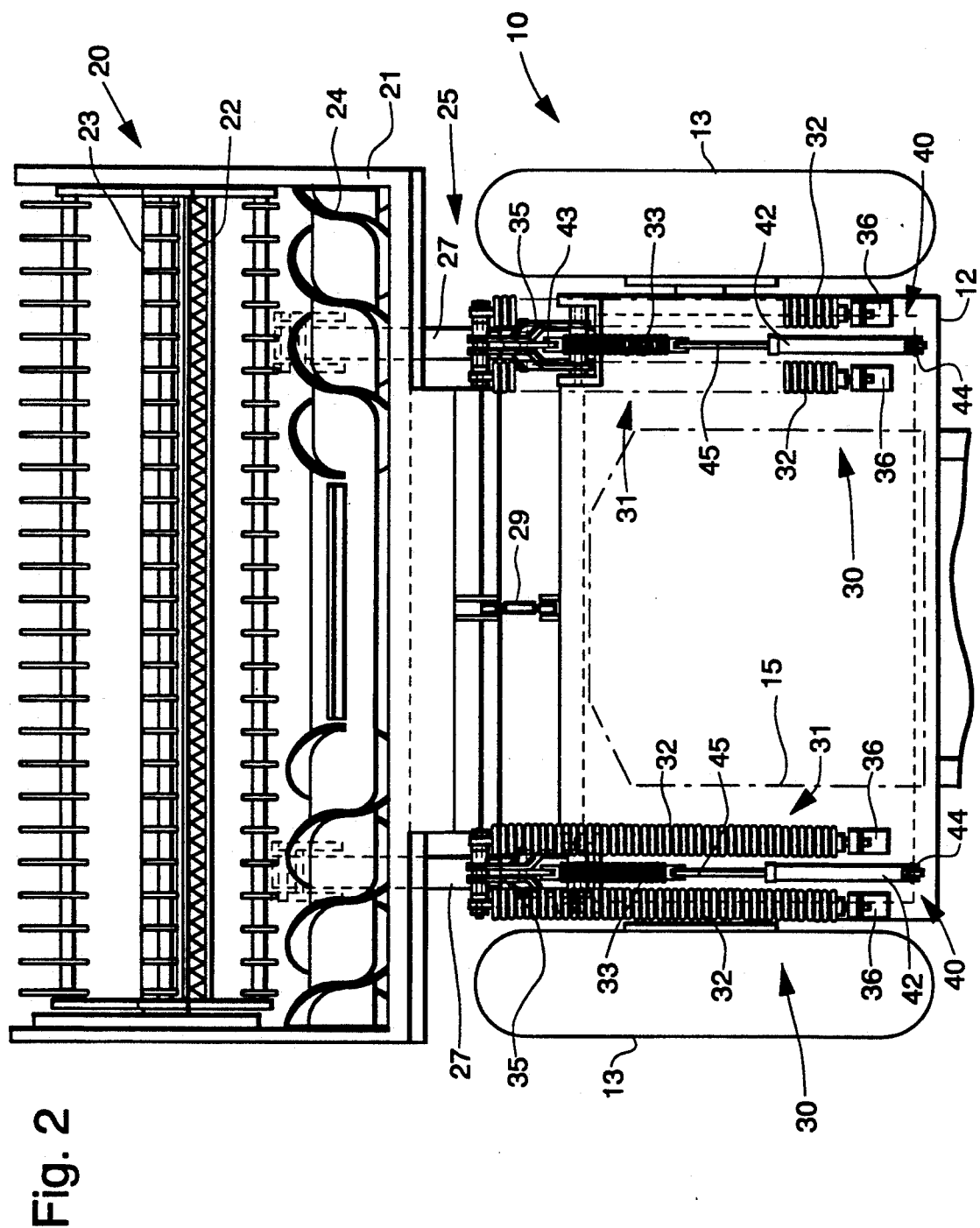
FIG. 2 is a partial top plan view of the forward portion of the crop harvesting machine taken along lines 2—2 of FIG. 1 to show the crop harvesting header, the header suspension mechanism and the flotation adjustment mechanism.
Figure 3:
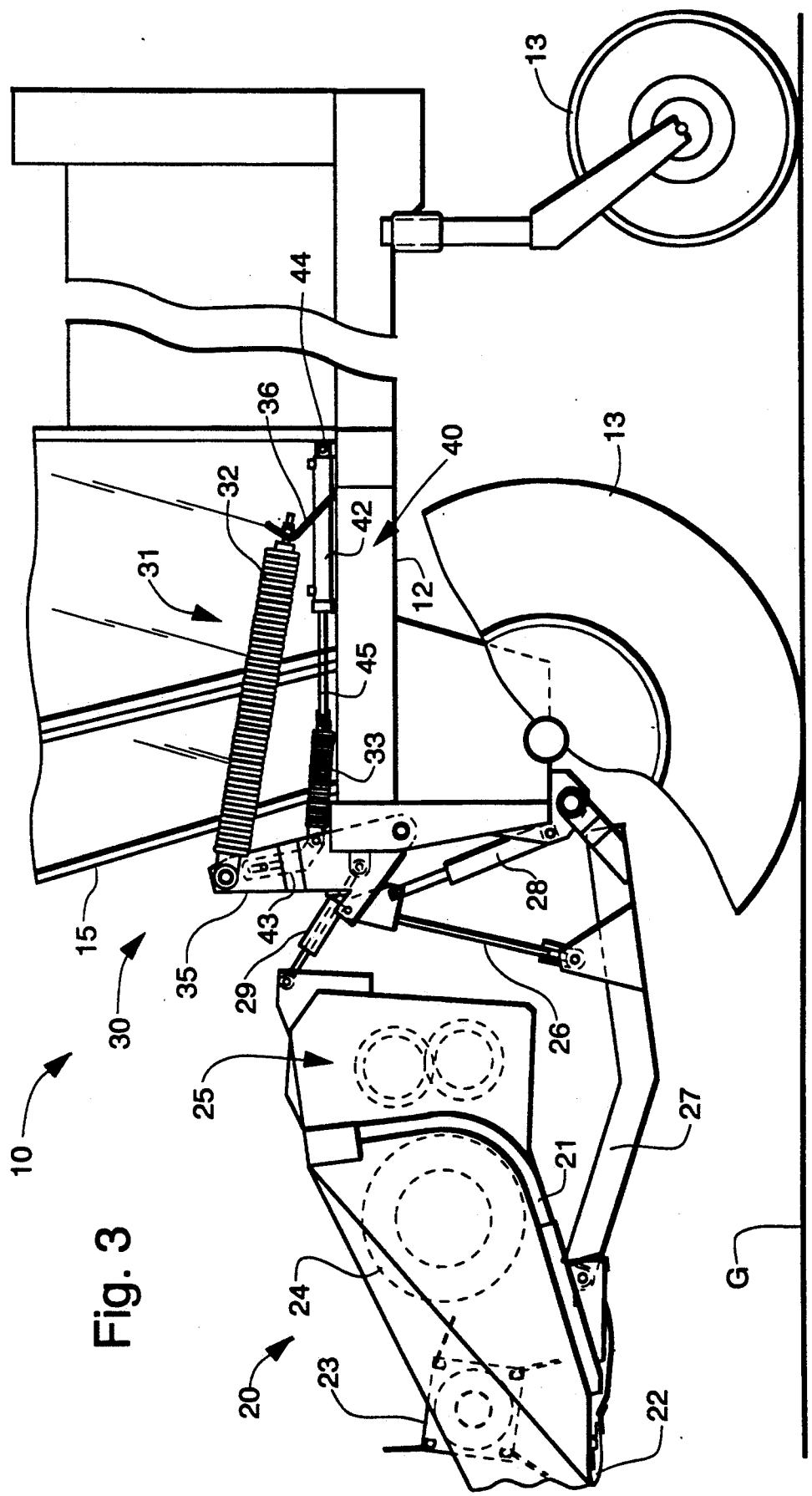
FIG. 3 is a fragmentary side elevational view similar to FIG. 1, except that the crop harvesting header is raised to a non-operative transport position.

Referring now to FIGS. 1-3, a crop harvesting machine 10 incorporating the principles of the instant invention, can best be seen. The crop harvesting machine 10 includes a frame 12 mobilely supported over the ground G by conventional wheels 13 and supports an operator's cab 15 located in an elevated position to command a view of the harvesting operation. A crop harvesting header 20 is suspended from the frame 12 of the harvesting machine 10 to initiate the crop harvesting process within the view afforded to the operator from his cab 15.

The header 20 includes a sub-frame 21 to provide some rigidity to the structure of the header 20. A forwardly positioned cutterbar 22 is positionable adjacent the ground G to sever standing crop material and start the harvesting process. A conventional reel 23 engages the severed crop material and conveys it rearwardly to a transverse auger 24 that consolidates the crop material and discharges the consolidated crop material rearwardly through an opening (not shown) for further harvesting treatment. The representative harvesting machine 10 depicted in these drawings is commonly referred to as a swather or a windrower and utilizes a crop conditioning mechanism 25, which can be affixed to the header 20 for movement therewith or fixed to the frame 12, to receive the consolidated crop material from the auger 24 to further harvest the material.

The header 20 is suspended from the frame 12 of the crop harvesting machine 10 by a suspension mechanism 30. A pair of laterally spaced lift arms 27 for part of the lift linkage for raising and lowering the header 20 relative to the frame 12. The lift arms 27 are pivotally connected to the frame 12 and extend under the sub-frame 21 of the header 20 to support the header 20 from the lift arms 27. Hydraulic lift cylinders 28, interconnecting the frame 12 and the lift linkage 27, provide a means for powering the vertical movement of the header 20, as shown in comparison between FIGS. 1 and 3.

In FIG. 1, the header is lowered against the ground G to a position where the cutterbar 22 can sever the standing crop close to the surface of the ground G. In FIG. 3, the lift cylinders 28 have been extended to effect a vertical movement of the lift arms 27 and a resultant raising of the header 20 into a raised, non-operative transport position. To stabilize the position of the header 20 on the lift arms 27, the header 20 is connected to the frame 12 of the harvesting machine 10 by an upper stabilizing link 29. By making the length of the upper stabilizing link 29 adjustable, it is possible to change the angle at which the cutterbar 22 engages standing crop material.

The header 20 is suspended from the frame by a suspension mechanism 30 which includes a pivot member 35 pivotally connected to the frame 12. The pivotal movement of the lift arms 27 for vertically moving the header 20 is accomplished by the lift cylinder 28 operatively interconnecting the frame 12 and the pivot member 35 to control the pivotal movement thereof. Movement of the pivot member 35 caused by extension of the lift cylinder 28 is transferred to the respective lift arms 27 by the connecting links 26.

The suspension mechanism 30 includes a spring assembly 31 connected at one end to the pivot member 35 and extending rearwardly therefrom to a mounting tab 36 fixed to the frame 12. While the spring assembly 31 could comprise a single spring, most crop harvesting headers are rather heavy and require a group of springs to provide adequate flotation characteristics. The spring assembly 31 comprises a pair of laterally disposed main springs 32 extending between the pivot member 35 and the mounting tabs 36 and an adjustment spring operatively disposed between the pivot member 35 and the frame 12 as described in greater detail below.

The main springs 32 provide a substantially fixed amount of flotation force when the header is in the operative position as shown in FIG. 1. This flotation force is relatively constant because the pivot member 35 does not generally move when the header 20 is in the operative position and, as a result, the length of the main springs does not substantially vary. Although the length of the main springs 32 is shortened when the header 20 is raised to the transport position as shown in FIG. 3 because of the upward pivotal movement of the pivot member 35, the extent of flotation force exerted thereby is irrelevant as most of the weight of the header 20 is borne through the lift cylinders 28.

The flotation adjustment mechanism 40 is preferably operatively associated only with the adjustment flotation spring 33. The adjustment flotation spring 33 extends between a lost motion link 43 connected to the pivot member 35 and a linear actuator, preferably in the form of a hydraulic cylinder 42 mounted to the frame 12 of the harvesting machine 10 at a mount 44. The flotation force exerted on the header 20 through the adjustment spring 33 is additive to the substantially constant flotation forces exerted by the main springs 32. The effective length of the adjustment spring 33 is controlled by the extension of the ram 45 of the hydraulic cylinder 42.

Figure 4:
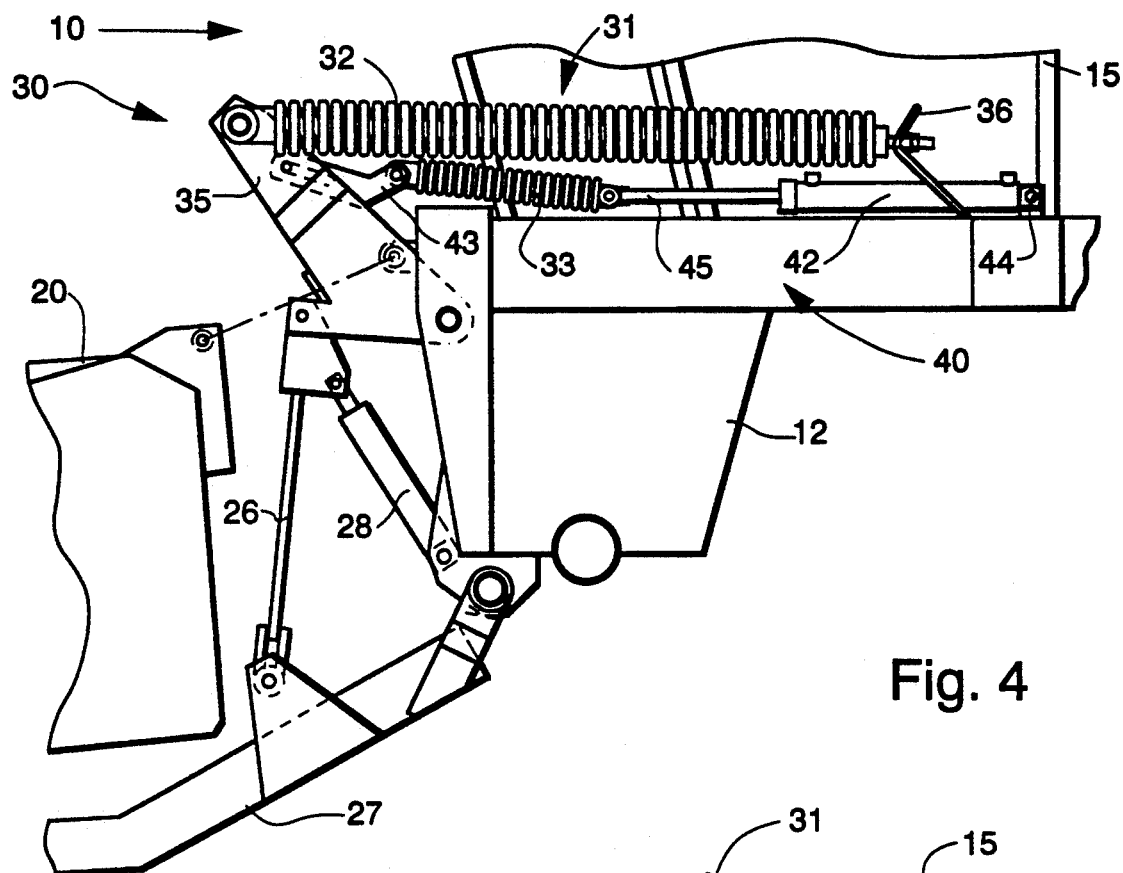
FIG. 4 is an enlarged partial side elevational view of the header suspension mechanism showing the relationship between the frame, suspension mechanism and crop harvesting header, with the flotation adjustment mechanism being set to minimize the flotation force exerted on the header, resulting in a greater amount of the weight of the header being exerted on the ground.
Figure 5:
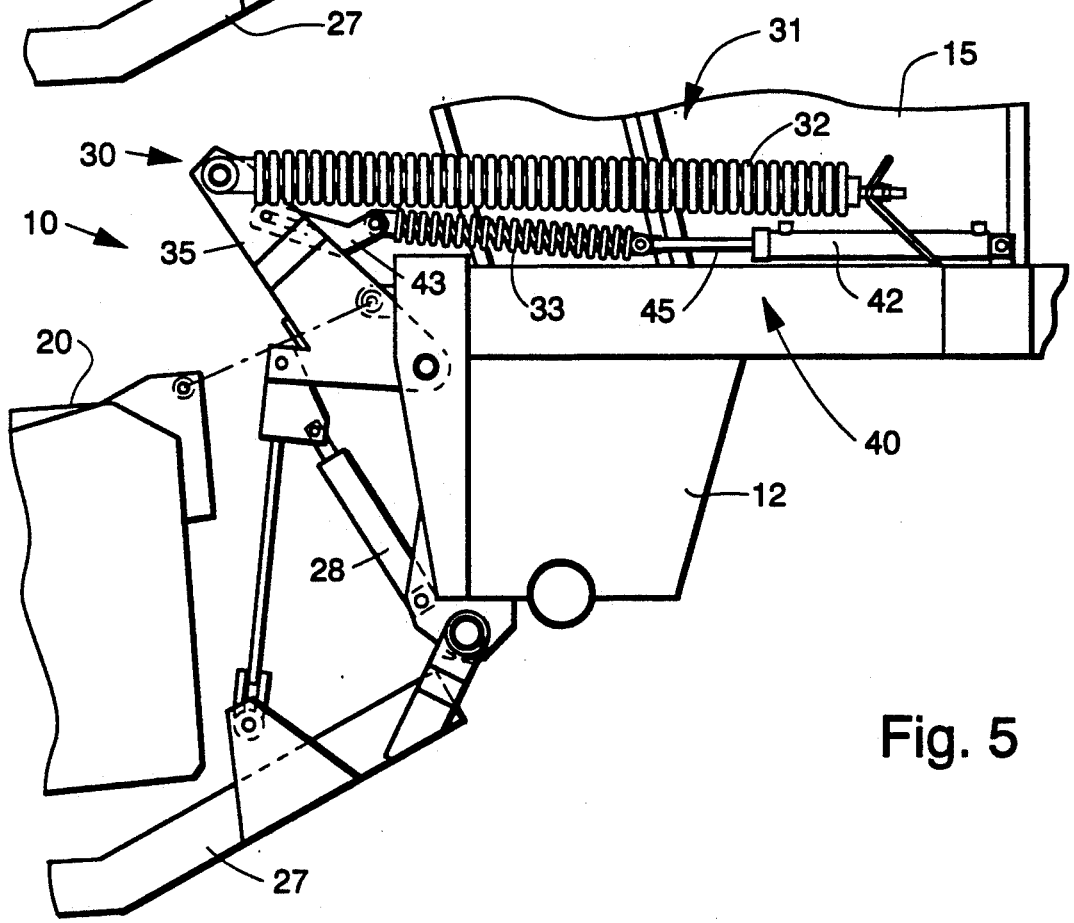
FIG. 5 is an enlarged partial side elevational view similar to FIG. 4, except that the ram of the flotation adjustment mechanism has been retracted to increase the header flotation force and, thereby lighten the weight of the header resting on the ground.

As depicted through a comparison of the views of FIGS. 4 and 5, the adjustment spring 33 is situated so that the maximum spring force is exerted whenever the ram 45 is completely retracted into the hydraulic cylinder, and minimized whenever the ram is completely extended. Accordingly, the amount of flotation force exerted on the header 20 through the pivot member 35 can be varied selectively between the relatively constant forces exerted by the main springs 32 and the forces exerted by the combination of the main springs 32 and the adjustment spring 33. One skilled in the art will readily realize that the header 20 will exert less weight on the ground G while in the operative position whenever the ram 45 of the hydraulic cylinder 42 is completely retracted.

As shown in a comparison of FIGS. 1 and 3, the lost motion link 43 accommodates the upward pivotal movement of the pivot member 35 whenever the header 20 is raised to the transport position without requiring a buckling of the adjustment spring 33 and attached hydraulic cylinder 42, irrespective of the amount of extension of the ram 45. Whenever the header 20 is lowered to the operative position shown in FIG. 1, the flotation force set prior to the raising of the header 20 by the positioning of the extensible ram 45 will automatically return as the lost motion link will bottom out and re-stretch the adjustment spring 33 to the previous setting. Should the flotation force need to be adjusted during operation of the crop harvesting machine 10 while the header is in the operative position, the operator need only manipulate the remote hydraulic controls for the cylinder 42 and effect a varying of the spring force accordingly.

One skilled in the art will realize that the entire spring assembly 31 could be connected to the hydraulic cylinder 42 allowing an adjustment of the flotation force from essentially nothing to the maximum attributable to the spring assembly 31. The embodiment depicted in the drawings is preferred, however, because the minimum flotation force can be set at a value well above zero and the working flotation range can be established through selection of the size of the spring and the spring rate thereof.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a harvesting machine having a frame adapted for movement over the ground; a crop harvesting header supported from said frame for generally vertical movement relative thereto; a header lift mechanism interconnecting said header and said frame for selectively raising said header off the ground; and flotation means interconnecting said frame and said header to support at least a portion of the weight of said header from said frame, the improvement comprising:

adjustment means operatively associated with said flotation means for selectively varying the amount of weight of said header to be supported from said frame while said frame is moving over the ground, said adjustment means operating independently of said header lift mechanism.

2. The harvesting machine of claim 1 wherein said flotation means includes at least one spring operatively disposed between said header and said frame to urge said header to lift from the ground, said adjustment means being operatively connected to said at least one spring to vary the lifting force exerted by said at least one spring.

3. The harvesting machine of claim 2 wherein said adjustment means includes a linear actuator having an extensible ram connected to said at least one spring, the retraction of said extensible ram causing said at least one spring to increase in length and, thereby, increase the lifting force exerted on said header.

4. The harvesting machine of claim 3 wherein said linear actuator comprises a hydraulic cylinder powered from a supply of hydraulic fluid under pressure carried by said frame.

5. The harvesting machine of claim 4 wherein said flotation means includes a first spring interconnected between said header and said frame and a second spring operatively associated with said adjustment means and being disposed between said header and said frame.

6. The harvesting machine of claim 5 wherein said flotation means comprises a plurality of individual springs interconnecting said header and said frame, only one spring of said plurality of springs being operatively associated with said hydraulic cylinder.

7. The harvesting machine of claim 6 wherein said header is suspended from said frame by a pair of flotation means and corresponding adjustment means positioned, respectively, on opposing sides of a longitudinally extending centerline.

8. A crop harvesting machine comprising:
a frame adapted for movement over the ground;
a crop harvesting header supported from said frame for movement relative thereto, said crop harvesting header being engageable with the ground;
a header lift mechanism interconnecting said header and said frame for selectively raising said header off the ground;
flotation means interconnecting said frame and said header to support at least a portion of the weight of said header from said frame, said flotation means being selectively variable to vary the portion of the weight of said crop harvesting header carried by said frame and thereby selectively vary the portion of the weight of said crop harvesting header exerted upon the ground; and
adjustment means operatively associated with said flotation means for selectively varying the amount of weight of said header to be supported from said frame while said frame is moving over the ground, said alignment means operating independently of said header lift mechanism.

9. The crop harvesting machine of claim 8 wherein said adjustment means includes a linear actuator having an extensible ram operably connected to said flotation means, the movement of said extensible ram causing said flotation means to vary the amount of weight of said header to be supported from said frame.

10. The crop harvesting header of claim 9 wherein said flotation means includes at least one spring operatively disposed between said header and said frame to urge said header to lift from the ground, said adjustment means being operatively connected to said at least one spring.

11. The crop harvesting header of claim 10 wherein said flotation means comprises a plurality of individual springs interconnecting said header and said frame, said adjustment means being operatively associated with only one of said plurality of springs.

12. The crop harvesting header of claim 11 wherein said linear actuator comprises a hydraulic cylinder powered from a supply of hydraulic fluid under pressure carried by said frame.

13. The crop harvesting header of claim 12 wherein said header is suspended from said frame by a pair of flotation means and corresponding adjustment means positioned, respectively, on opposing sides of a longitudinally extending centerline.

14. The crop harvesting header of claim 13 wherein said pair of adjustment means are cooperatively connected so as to be actuated in concert with one another.

15. A crop harvesting machine comprising:
a frame adapted for movement over the ground;

a crop harvesting header supported from said frame for movement relative thereto, said crop harvesting header being engageable with the ground;

a first flotation spring means interconnecting said frame and said header to support at least a portion of the weight of said header from said frame, said first flotation spring means being selectively variable to vary the portion of the weight of said crop harvesting header carried by said frame and thereby selectively vary the portion of the weight of said crop harvesting header exerted upon the ground; and a second floatation spring means interconnecting said frame and said header and being selectively operable to support at least a portion of the weight of said header from said frame in addition to the operation of said first flotation spring means, said second flotation spring means including a second spring coupled to a linear actuator anchored to said frame and having an extensible ram operably connected to said second spring, the movement of said extensible ram varying the effective length of said second spring to vary the amount of weight of said header to be supported from said frame by said second spring.

16. A crop harvesting machine of claim 15 wherein said extensible ram is positionable to completely relax said second spring to place said second flotation spring means in an inoperative state.

17. The crop harvesting machine of claim 16 wherein said header is suspended from said frame by a pair of first flotation spring means and corresponding pair of second flotation spring means positioned, respectively, on opposing sides of a longitudinally extending centerline.

18. The crop harvesting machine of claim 17 wherein said pair of linear actuators are cooperatively connected so as to be actuated in concert with one another.

19. The crop harvesting machine of claim 18 wherein each said linear actuator comprises a hydraulic cylinder powered from a supply of hydraulic fluid under pressure carried by said frame.

20. The harvesting machine of claim 190 wherein said first flotation spring means includes a plurality of individual first springs interconnecting said header and said frame.

* * * * *